United States Patent
Gerhardt et al.

[11] Patent Number: 5,305,940
[45] Date of Patent: Apr. 26, 1994

[54] STUD WELDING DEVICE

[75] Inventors: Alfred Gerhardt, Lahnau; Kurt Liebich, Lich, both of Fed. Rep. of Germany

[73] Assignee: Emhart Inc., Newark, Del.

[21] Appl. No.: 98,184

[22] Filed: Jul. 28, 1993

[30] Foreign Application Priority Data

Jul. 31, 1992 [DE] Fed. Rep. of Germany ....... 4225415

[51] Int. Cl.$^5$ .............................................. B23K 9/20
[52] U.S. Cl. .................................... 228/4.1; 219/98
[58] Field of Search ........................ 228/4.1; 219/98

[56] References Cited

U.S. PATENT DOCUMENTS 3,603,762  9/1971  Spisak ..................... 219/98
4,137,445  1/1979  Ettinger .................. 219/98

FOREIGN PATENT DOCUMENTS 0361966  4/1990  European Pat. Off. .
8010343  3/1982  Fed. Rep. of Germany .

Primary Examiner—Kenneth J. Ramsey
Attorney, Agent, or Firm—Edward D. Murphy

[57] ABSTRACT

A stud welding device for use in welding T studs comprises a receiver into which T studs are fed from a feeding device and located in the path of a plunger which carries the stud into a welding position. Spring means are provided in the receiver to engage the head of a T stud fed into the receiver to hold the stud in place thus to reduce the possibility of jamming.

3 Claims, 2 Drawing Sheets

STUD WELDING DEVICE

This is invention relates to stud welding devices.

BACKGROUND TO THE INVENTION

A particular type of stud which is commonly used in stud welding devices is T shaped, having a shank and a head of greater diameter than the shank. Such studs, which are referred to as "T studs" are often used in large quantities e.g. in the manufacture of automobiles, and with the shank welded to a work piece provide a convenient basis for further attachments to be secured to the workpiece.

To achieve a high rate of operation T studs are normally fed automatically by a feeding device to the stud welding device—frequently indeed the stud welding device is used in an automatic production line without the individual supervision of an operator. Should a stud be misfed into the stud welding device and jam, the whole operation of the production line may have to be stopped while the jam is cleared and the device returned to proper operations.

It is one of the objects of the present invention to provide a stud welding device for use in welding T studs in which the possibility of the T stud becoming jammed in the device is much reduced.

BRIEF STATEMENT OF THE INVENTION

The present invention provides a stud welding device comprising a plunger movable between an advanced and a retracted position a receiver adapted to receive a T stud from a feeding device and comprising a T shaped transverse passage through which a T stud may pass to an axial bore which is of a diameter corresponding to that of the head of the T stud, the plunger being mounted for movement in the axial bore of said receiver so that the plunger in its movement from its retracted position to its advanced position carries a T stud located in the axial bore to locate it against a work piece for welding thereto and spring means in the receiver adjacent the axial bore arranged to engage a circumferential face of the head of a T stud fed through the transverse passage into alignment with the axial bore.

the axial bore being of a diameter corresponding to that of the head of a T stud characterized in that spring means are provided adjacent the axial bore arranged to engage a circumferential face of the head of a T stud fed along the passage from the feeding device into alignment with the bore.

DETAILED DESCRIPTION OF THE INVENTION

Figure 1:
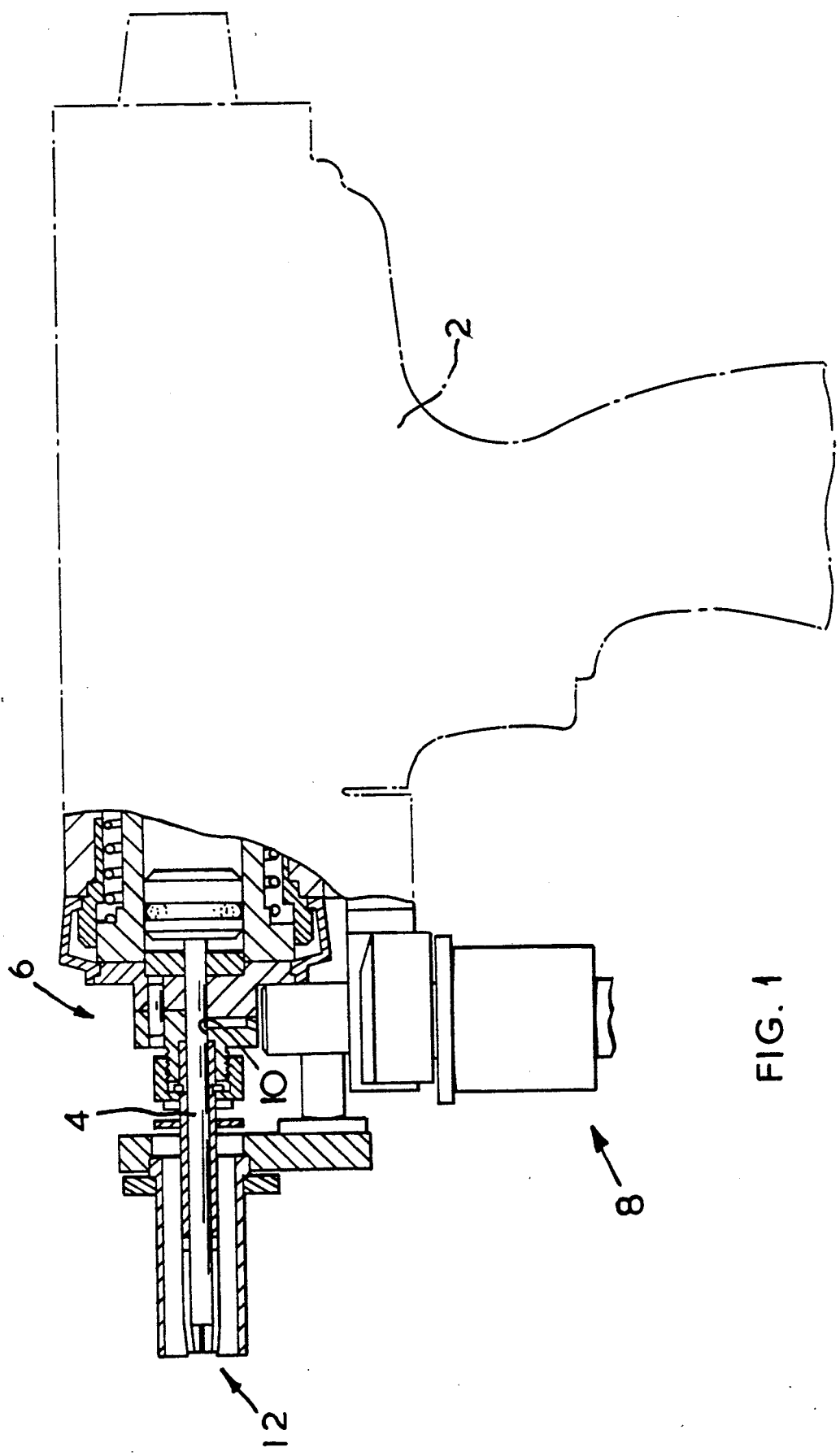
FIG. 1 shows, diagrammatically, a stud welding device.

A stud welding device 2 (FIG. 1) which is largely of conventional construction comprises a plunger 4 which is movable between an advanced position (shown in FIG. 1 and a retracted position (not shown). The device also comprises a receiver 6 which is adapted to receive a T stud T from a feeding device 8, part only of which is shown in FIG. 1. The receiver 6 comprises an axial bore 10 in which a T stud may be located in the path of the plunger 4, which moves through the bore, so that the plunger 4 in its movement from its retracted to its advanced position carries the stud to a nose piece 12 to locate the stud against a workpiece for welding thereto.

Figure 2:
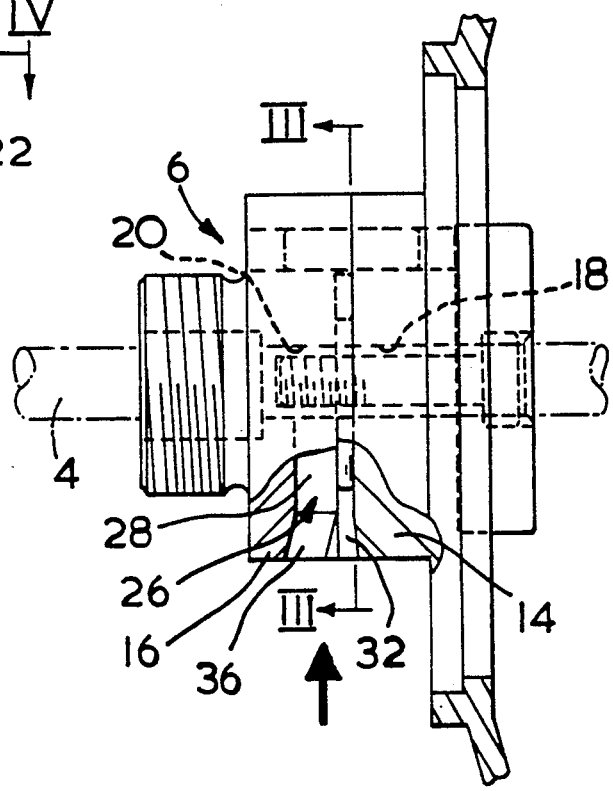
FIG. 2 shows, partly broken away, a receiver member of the stud welding gun.
Figure 4:
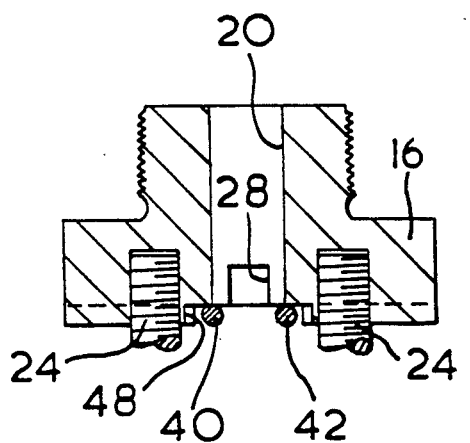
FIG. 4 shows a view in section taken along the line IV—IV of FIG. 3.

The receiver 6 is shown in more detail in FIG. 2. It comprises a supporting member 14, by which it is attached to the body of the stud welding device, and a locating member 16.

Figure 3:
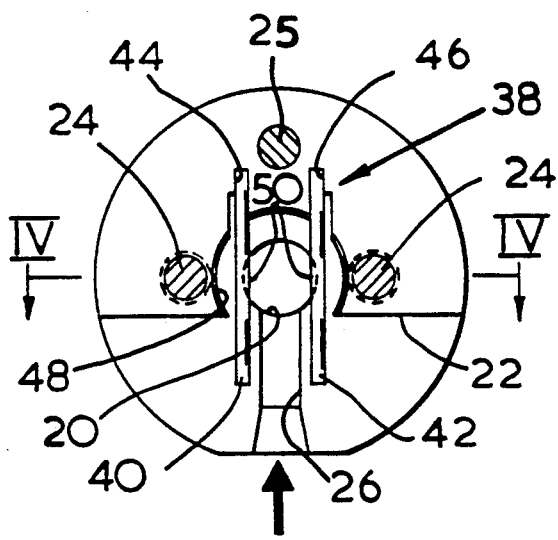
FIG. 3 shows a view in section taken along the line III—III of FIG. 2.

The bore 10 is provided by aligned bores 18, 20 provided respectively in the supporting member 14 and the locating member 16. A step 22 formed on the locating member 16 mates with a corresponding step on the supporting member 14 and the two members are secured together by two bolts 24 and a pin 25. A transverse passage 26 is formed between the two members 14 and 16, and is T shaped, comprising a narrow leg portion 28, formed in the member 16 and appropriate to accommodate the shank 30 of a T stud T, and a wider, head portion 32, formed between the members 14 and 16 and appropriate to accommodate the head 34 of a T stud T. The passage 26 comprises a widened, lead in portion 36 at its outer end portion, to enable studs fed from the feeding device readily to pass into the passage 26 (as indicated by the arrows in FIGS. 2 and 3).

Figure 5:
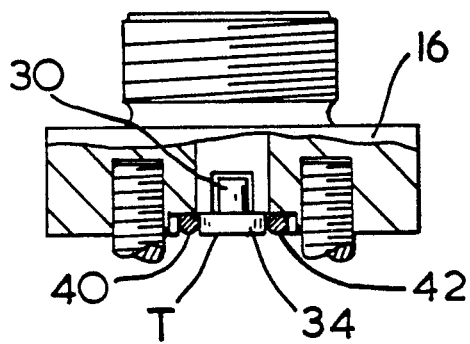
FIG. 5 shows a view corresponding to FIG. 4 with a T stud in position.

Located between the supporting member 14 and the locating member 16 are spring means 38 which are situated adjacent the bore 10 and are arranged to engage a circumferential face of the head 34 of a T stud fed from the feeding device into the receiver 6 (see FIG. 5). The spring means 38 comprises two wire spring members 40,42, which lie in grooves 44,46, formed in member 16, and in two similar grooves (not shown) formed in the member 14. The spring members are, as can be seen from FIG. 3 arranged diametrically opposed across the bore 10 parallel to each other and to the direction in which the stud is supplied along the passage 26 into the receiver 6. The grooves 44,46, in the member 16 (and similarly the grooves in the member 14) have narrow end portions adapted to fit closely around the spring members 40 and 42 and somewhat wider portions towards the bore 10. A recess 48 a little deeper than the spring members 40,42, is formed between the two members 14 and 16 concentric with the bore 10. The spring members 40 and 42 are arranged so that central portions 50, extend slightly into the passage 10.

When the stud welding device is in operation, a T stud is fed under air pressure from the feeding device 8 into the passage 26 while the plunger 4 is in its retracted position. The T stud passes into alignment with the passage 10, deflecting the spring members 40,42, slightly outwards into the recess 48, and the spring member 40,42, engaging the outer circumferential face of the head 34 of the T stud holds the stud in position in the receiver to be engaged by the plunger on its movement into its advanced position. Misorientation of the T stud, and possible jamming of the stud welding device is thus avoided.

It will be understood that while, for the purposes of illustration, a hand held stud welding device 2 has been described, the construction of the invention is equally useful in an automatic, fixed, stud welding device.

We claim:

1. A stud welding device comprising a plunger movable between an advanced and a retracted position a receiver adapted to receive a T stud from a feeding device and comprising a T shaped transverse passage through which a T stud may pass to an axial bore which is of a diameter corresponding to that of the head of the T stud, the plunger being mounted for movement in the axial bore of said receiver so that the plunger in its movement from its retracted position to its advanced position carries a T stud located in the axial bore to locate it against a work piece for welding thereto and spring means in the receiver adjacent the axial bore arranged to engage a circumferential face of the head of a T Stud fed through the transverse passage into alignment with the axial bore.

2. A stud welding device according to claim 1 in which the spring means comprise two spring members arranged diametrically opposed across the bore parallel to each other and to the direction in which the stud is supplied from the feeding device.

3. A stud welding device according to claim 2 wherein each spring member is in the form of a wire having end portions clamped in the receiver.

* * * * *